March 25, 1969     J. BURNBAUM     3,434,653
COMBINATION MOTOR AND BLOWER
Filed Sept. 19, 1967     Sheet _1_ of 2

Inventor:
Jack Burnbaum
by Harold E. Cole
Attorney

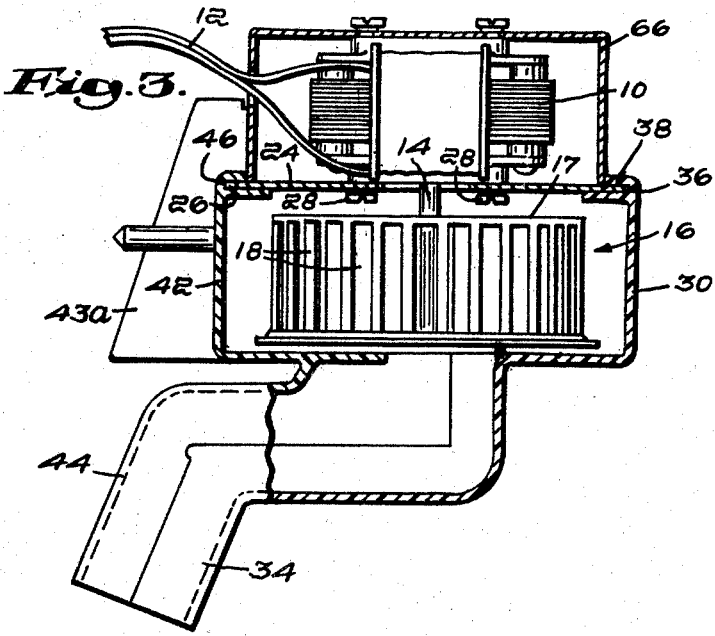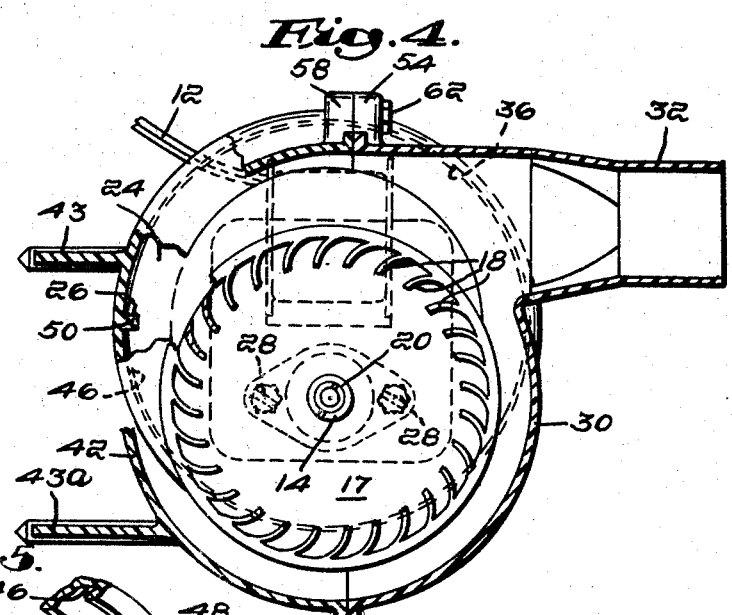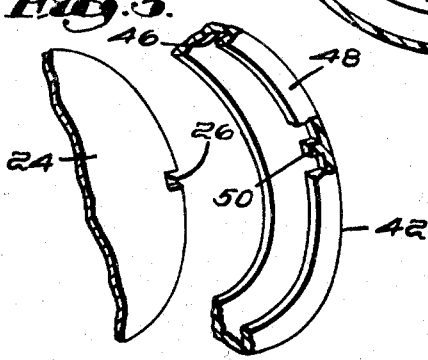

United States Patent Office 3,434,653
Patented Mar. 25, 1969

3,434,653
COMBINATION MOTOR AND BLOWER
Jack Burnbaum, 451 D St., Newton, Mass. 02110
Filed Sept. 19, 1967, Ser. No. 668,820
Int. Cl. F04d 25/06, 25/08, 17/08
U.S. Cl. 230—117                              9 Claims

ABSTRACT OF THE DISCLOSURE

A combination motor and blower having a deflector between them to prevent blown particles reaching the motor. A housing for the blower is in two sections each having a recess formed therein bordered by a flange and adapted to receive said deflector to thereby retain the latter interiorly of blower.

---

One object of my invention is to provide means to protect a motor from small particles that are forced by a blower from a housing, which motor actuates the blower.

In operating a circulating device that forces very small particles from a blower, especially where they will be re-circulated continuously, the motor should be kept free of said particles. This must be accomplished while using a minimum of space and hence any deflector or protector of the motor should be so mounted that a compact housing can be used.

A further object is to provide such a mounting that is simple to install and requires no fastening means whatsoever to retain the deflector in postiion.

The foregoing and other objects which will appear as the nature of the invention is better understood, may be accomplished by a construction, combination and arrangement of parts such as is disclosed by the drawings. The nature of the invention is such as to render it susceptible to various changes and modifications, and, therefore, I am not to be limited to the particular construction disclosed by the drawings nor to that described in the specification; but am entitled to all such changes therefrom as fall within the scope of my claims.

In the drawings:

FIG. 3 is a sectional view taken on the line 3—3 of FIG. 2.

FIG. 4 is a sectional view taken on the line 4—4 of FIG. 1.

FIG. 5 is an exploded, fragmentary, perspective view of the deflector and a housing section having a recess to receive the deflector.

Figure 1:
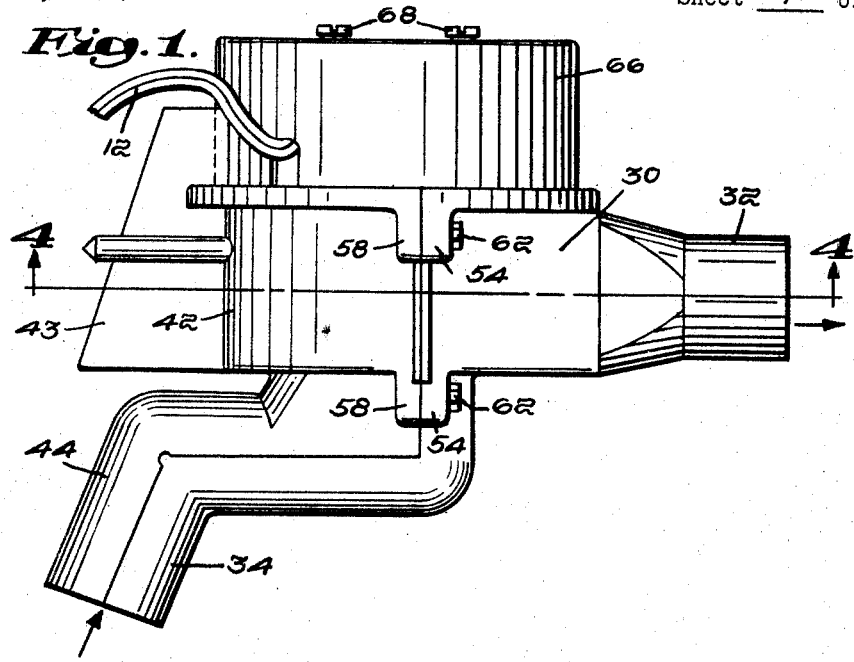
FIG. 1 is a side elevational view of my combination motor and blower.
Figure 2:
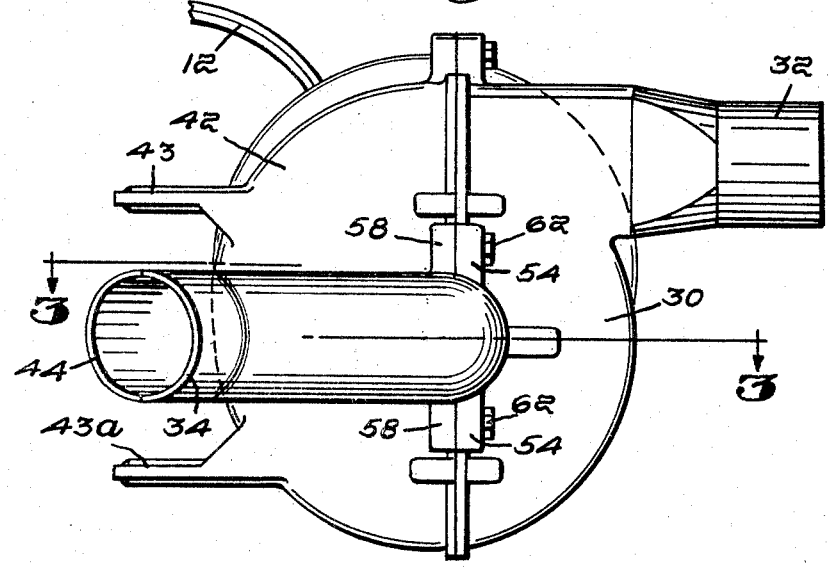
FIG. 2 is a top plan view thereof.

As illustrated, a motor 10 from which a power cord 12 extends has a shaft 14 extending outwardly to a well-known blower 16 having a back plate 17 through which said shaft extends, and the usual impeller blades 18. A collar 20 attached to said plate 17 receives and holds said shaft, whereby rotation of the blower is effected.

Between said motor 10 and blower 16 is a deflector 24 in the form of a flat, solid disc through which said shaft 14 extends and which has a positioning slot 26 at its periphery later explained. Bolts 28 hold said deflector to and in contact with said motor, and spaced from said blower.

Said blower 16 extends into a housing that is formed of two half sections 30 and 42 later described. Said housing section 30 has an outlet conduit portion 32 and an angular inlet conduit portion 34. At one side of said section 30 an arc-shaped recess 36 is provided that forms a half circle and which is bordered at the outside by a retainer flange 38.

Said housing half section 42 has extension wings 43 and 43a and an inlet conduit portion 44 that completes a conduit with said conduit portion 34. At one side of said section 42 is an arc-shaped recess 46 which completes a circle with said recess 36. A retainer flange 48 completes a circle with said flange 38 when the two sections are joined. Said deflector 24 enters said recesses and is retained therein by said retainer flanges 38 and 48. A positioning lug 50 extends partly into said recess 46 and enters said positioning slot 26 in said deflector 24 when the housing sections are assembled to form a complete housing.

Said half section 30 has lugs 54 formed thereon and likewise said section 42 has lugs 58. Screws 62 extend through said lugs to join said two sections together.

A cover 66 covers said motor, being held thereto by screws 68 that enter the latter.

What I claim is:

1. A combination motor and blower, said motor having an outwardly extending shaft rotatably fixed to said blower, a deflector between said motor and blower and fixed to said motor, said shaft rotatably extending through said deflector, a housing for said blower having two sections adapted to be joined, each said section having a recess adjacent one side thereof, and a retainer flange outside of each said recess, said deflector extending into said recesses and being retained by said retainer flanges when said sections are joined.

2. A combination motor and blower defined in claim 1, said deflector being a flat disc.

3. A combination motor and blower as defined in claim 2, a face of said disc contacting said motor.

4. A combination motor and blower as defined in claim 1, said housing sections having portions forming a conduit extending outwardly from a side of said blower opposite said retainer flanges.

5. A combination motor and blower as defined in claim 4, said housing sections having portions forming a conduit extending outwardly from a point intermediate said sides.

6. A combination motor and blower as defined in claim 1, said housing sections having lugs extending outwardly beyond said retainer flanges and means attaching said lugs together.

7. A combination motor and blower defined in claim 1, one said section having a lug extending into its said recess, said deflector having a peripheral slot adapted to receive said lug to thereby position said deflector in said recesses.

8. A combination motor and blower as defined in claim 1, each said recess extending substantially to the periphery of a said section.

9. A combination motor and blower as defined in claim 1, each said flange extending to and forming part of the periphery of a said section.

References Cited

UNITED STATES PATENTS 2,188,741   1/1940   Roberts _____ 230—117 XR
3,193,259   7/1965   Liebmann _____ 230—117 XR ROBERT M. WALKER, *Primary Examiner.*

U.C. Cl. X.R.
230—127, 232